(12) United States Patent
Blank et al.

(10) Patent No.: US 10,830,634 B2
(45) Date of Patent: Nov. 10, 2020

(54) FILL LEVEL DETECTION AND CONTROL

(71) Applicant: Deere & Company, Moline, IL (US)

(72) Inventors: Sebastian Blank, Bettendorf, IA (US); Oliver Grüenewald, Schindhard (DE)

(73) Assignee: Deere & Company, Moline, IL (US)

( * ) Notice: Subject to any disclaimer, the term of this patent is extended or adjusted under 35 U.S.C. 154(b) by 298 days.

(21) Appl. No.: 15/912,882

(22) Filed: Mar. 6, 2018

(65) Prior Publication Data

US 2019/0277687 A1 Sep. 12, 2019

(51) Int. Cl.
*G01G 19/08* (2006.01)
*B60W 30/18* (2012.01)
*B60W 40/107* (2012.01)

(52) U.S. Cl.
CPC .......... *G01G 19/086* (2013.01); *B60W 30/18* (2013.01); *B60W 40/107* (2013.01); *B60W 2530/10* (2013.01)

(58) Field of Classification Search
CPC .. G01G 19/086; B60W 30/18; B60W 40/107; B60W 2530/10
USPC ..... 701/1, 38; 280/5.506, 5.508, 735, 6.159; 180/282; 340/440
See application file for complete search history.

(56) References Cited

U.S. PATENT DOCUMENTS

| | | | | |
|---|---|---|---|---|
| 5,675,094 A * | 10/1997 | Klauber | ............... | B60G 17/019 73/862.191 |
| 6,829,943 B2 | 12/2004 | Weyand | | |
| 8,493,197 B2 * | 7/2013 | Nakanishi | ............... | B60N 2/002 340/436 |
| 9,470,599 B1 * | 10/2016 | Nakanishi | ............... | G01G 23/00 |
| 2002/0198645 A1 * | 12/2002 | Ishida | ................... | B60R 21/015 701/45 |
| 2009/0325658 A1 | 12/2009 | Phelan et al. | | |
| 2013/0080078 A1 | 3/2013 | Wirthlin | | |
| 2014/0317265 A1 * | 10/2014 | James | ................. | H04L 67/1004 709/224 |
| 2015/0105213 A1 | 4/2015 | Wright et al. | | |
| 2016/0221475 A1 * | 8/2016 | Sugiyama | ............... | B60N 2/04 |
| 2017/0131711 A1 * | 5/2017 | Thomson | ............. | G07C 5/0808 |
| 2017/0297563 A1 | 10/2017 | Kava et al. | | |
| 2018/0162410 A1 * | 6/2018 | Skillsater | ............. | B60W 50/14 |
| 2018/0188744 A1 * | 7/2018 | Switkes | ................ | B60W 10/22 |
| 2019/0265034 A1 * | 8/2019 | Kabasawa | ............. | G01P 15/125 |
| 2019/0308481 A1 * | 10/2019 | Kabasawa | ........... | G01P 15/0922 |
| 2019/0308626 A1 * | 10/2019 | Otanez | ................ | B60W 10/107 |

FOREIGN PATENT DOCUMENTS

CA 2967676 A1 5/2016

* cited by examiner

*Primary Examiner* — Tuan C To
(74) *Attorney, Agent, or Firm* — Joseph R. Kelly; Kelly, Holt & Christenson, PLLC

(57) ABSTRACT

Dynamic change information is detected on a vehicle, that is transporting a load receiving structure. The dynamic operational information is monitored to identify a period of dynamic change in the operation of the vehicle. The period of dynamic change is used to define a sampling window. The dynamic operational information, during the sampling window, is provided to fill level classifier logic that identifies a fill level corresponding to the dynamic operational information. A fill level metric, indicative of the identified fill level, is generated, and an action signal is generated based upon the fill level metric.

20 Claims, 13 Drawing Sheets

FILL LEVEL DETECTION AND CONTROL

FIELD OF THE DESCRIPTION

The present description relates to mobile equipment. More specifically, the present description relates to identifying a fill level of a wagon towed by a towing vehicle, a dump truck, or other mobile machine that can be loaded with material.

BACKGROUND

There are a wide variety of different types of vehicles. Some vehicles include construction equipment, forestry equipment, turf management equipment and agricultural equipment. These types of equipment often include vehicles or wagons that are filled with material, such as dump trucks, articulated dump trucks, other vehicles that have a hopper, dump body or other load receiving structure that can be loaded with material, towing vehicles that tow wagons that carry agricultural or other material. The present discussion proceeds with respect to a towing vehicle that tows a wagon, but it will be appreciated that this is just one example. As an example, a towing vehicle, such as a tractor, may tow a wagon that carries sugarcane billets that are unloaded from a sugarcane harvester into the wagon. There are a wide variety of other agricultural wagons as well.

It can be difficult for an operator of a towed vehicle to determine the fill level of a wagon. This is because it can be difficult for an operator to observe the contents of the wagon, from an operator's compartment of the towing vehicle. Observing the fill level of a towed cart or wagon can also be made more difficult if the towing vehicle is towing more than one cart. It can be even more difficult to observe the fill level of a second cart, when it is behind the first cart.

Some attempts have therefore been made to automatically detect the fill level of a wagon. For instance, some systems use a stationary scale and drive the wagon over the scale to obtain its fill level. Other systems sense tire inflation pressure in order to determine the load in the wagon. Other systems have frame, axle and/or hitch load cells that are mounted within a structural portion of the wagon, and generate an output indicative of a load in the wagon. While these and other approaches can be used to generate an estimate of fill level in a wagon, they can be relatively expensive. They require additional hardware, sensors, and often electronics and computing systems in order to generate the measure that is used to estimate the fill level of the wagon. This increases the cost of such systems.

These types of costs can be prohibitive in some scenarios. By way of example, they can be prohibitive in relatively large operations, such as in sugarcane operations, and other operations. The increased costs of maintenance and replacement with these types of systems can be undesirable in a wide variety of other ways as well. Some sugarcane mills, for instance, farm millions of acres of sugarcane fields. They can therefore use 100 or more sugarcane harvesters, each of which is supported by two tractors, each tractor pulling one or more billet carts. Therefore, a conventional sugarcane mill may own and/or operate 200 or more billet carts, and it may be desirable for the operator of the towing vehicle to know the fill level of those billet carts, during operation. However, attempting to retrofit or otherwise manufacture all of those carts with the hardware and computing resources needed (in conventional approaches to estimating fill level) can be extremely costly. It can also require a large amount of maintenance and repair, etc.

The discussion above is merely provided for general background information and is not intended to be used as an aid in determining the scope of the claimed subject matter.

SUMMARY

Dynamic operational information is detected on a vehicle, that moves a load receiving structure of material (such as a tractor towing a wagon carrying the material, or a dump truck carrying the material, etc.) They dynamic operational information is monitored to identify a period of dynamic change in the operation of the vehicle. The period of dynamic change is used to define a sampling window. The dynamic operational information, during the sampling window, is provided to fill level classifier logic that identifies a fill level. A fill level metric, indicative of the identified fill level, is generated, and an action signal is generated based upon the fill level metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
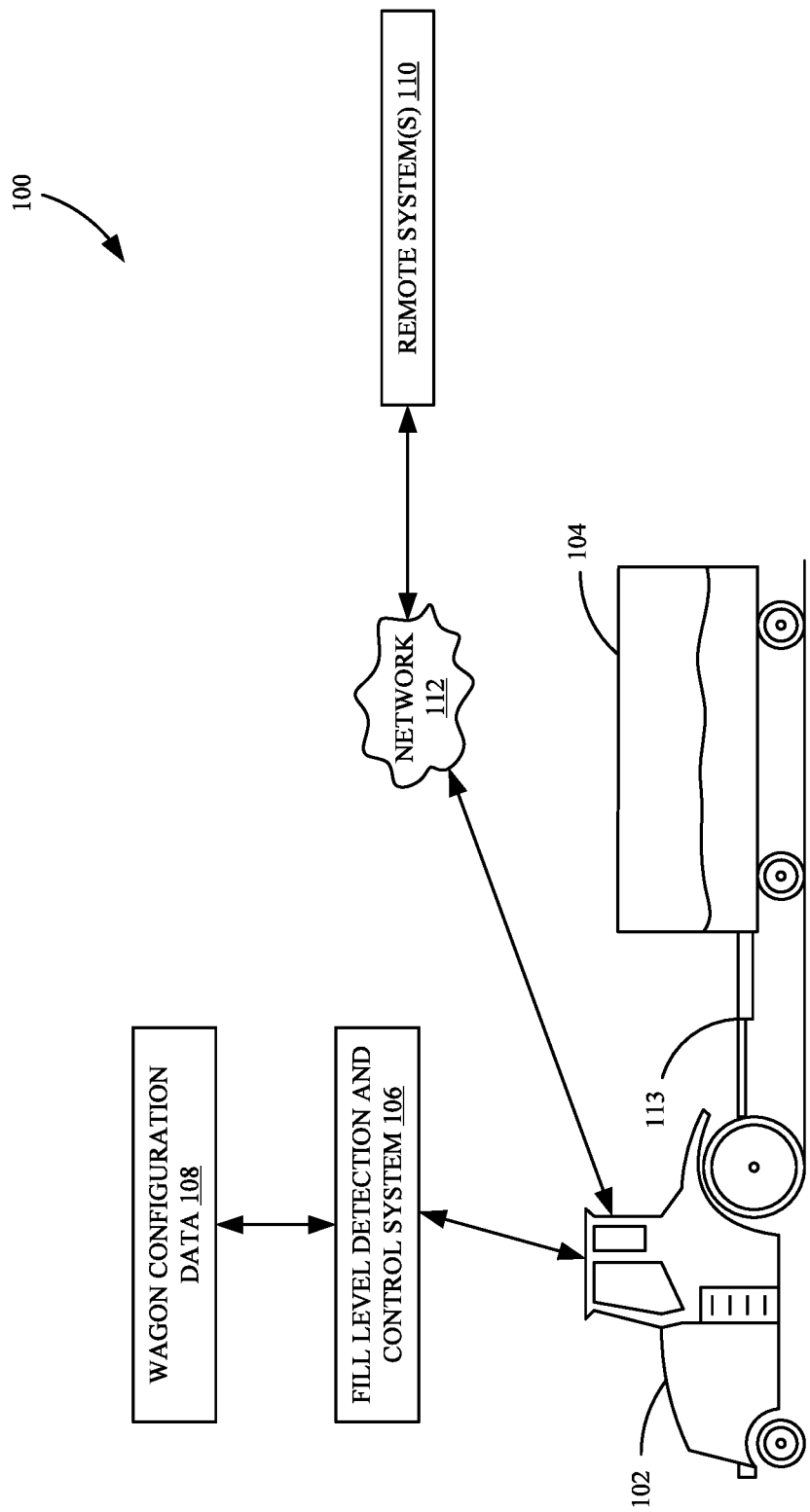
FIG. 1 is a partial pictorial diagram, partial block diagram of a towing vehicle architecture.

FIG. 1 is a partial pictorial view and partial block diagram of a vehicle architecture 100. As mentioned above, the present description will proceed with respect to a towing vehicle towing a wagon carrying material in which the fill level of the wagon is identified. However, this is just one example, and the same description could just as easily apply to determining the fill level of another material transporting vehicle, such as a dump truck, an articulated dump truck, a vehicle in the forestry industry or turf management industry, among others, that have a load receiving structure (like a box, hopper, dump body, etc.) that is loaded with the material to be transported.

In the present example, architecture 100 shows that a towing vehicle (such as a tractor) 102 is towing an agricultural wagon 104. In one example, wagon 104 is a billet wagon that receives sugarcane billets that are unloaded into wagon 104 from a sugarcane harvester. It can be connected to tractor 102 by link 113. Link 113 can be a mechanical link, it can include a power link, such as a hydraulic link, or a mechanical power link, it can include a wired or wireless electronic link, or a wide variety of other links. This is only one example, and agricultural wagon 104 can be used for a wide variety of other purposes as well. FIG. 1 also shows that tractor 102 can be connected to one or more remote systems 110 through network 112. Network 112 can be any of a wide variety of different types of networks, such as a wide area network, a local area network, a nearfield communication network, a cellular communication network, or a wide variety of networks or combination of networks. Remote system 110 can be a remote server environment, a data center, a manager's computing system, a processing facility (e.g., mill) computing system, a dispatcher's computing system, a vendor's computing system, or a wide variety of other remote systems.

FIG. 1 also shows that, in one example, towing vehicle 102 is connected to fill level detection and control system 106. Fill level detection and control system 106 illustratively receives sensor signals from towing vehicle 102 (and can receive a wide variety of other information), and calculates a fill level of wagon 104. The fill level can be identified in various terms, such as in 25 percent increments, 10 percent increments, using a continuous indication, etc.

The fill level detection and control system 106 is also shown receiving wagon configuration data 108. Wagon configuration data 108 can be preconfigured in system 106, or it can be received dynamically, learned, or input by an operator of vehicle 102. The wagon configuration data 108 can include a wagon capacity, an unloaded weight of the wagon 104, among a wide variety of other configuration data.

As wagon 104 is loaded, fill level detection and control system 106 illustratively generates an output indicative of the fill level of wagon 104. It can do this continuously, periodically, or otherwise intermittently. It also generates a control or action signal based on that fill level. For instance, the control or action signal can be used to control a communication system on vehicle 102 that communicates with one or more remote systems 110 over network 112.

In another example, the control or action signal generated by system 106 can be used to control an operator interface mechanism in vehicle 102, in a harvester with which vehicle 102 is paired, at a dispatchers computer system where a dispatcher communicates with operators of other towing vehicles 102 to send them to the location of the harvester, or which communicates with a mill or other processing facility that is processing the agricultural material carried by wagon 104, or other mechanism. The control or action signal can also be used to control the operation of vehicle 102 (such as to initiate alarms, to slow or stop the vehicle movement, or to perform other control operations).

It will also be noted that, in the example shown in FIG. 1, fill level detection and control system 106 is shown separate from vehicle 102. In another example, however, it can be located on vehicle 102. In yet another example, it can be located in a remote server environment (such as in the cloud) where it is accessed by a communication system in vehicle 102. It can also be split so some parts of it reside one place while other parts reside in one or more other places. All of these, and other, architectures are contemplated herein and some of them are described in greater detail below.

Figure 2:
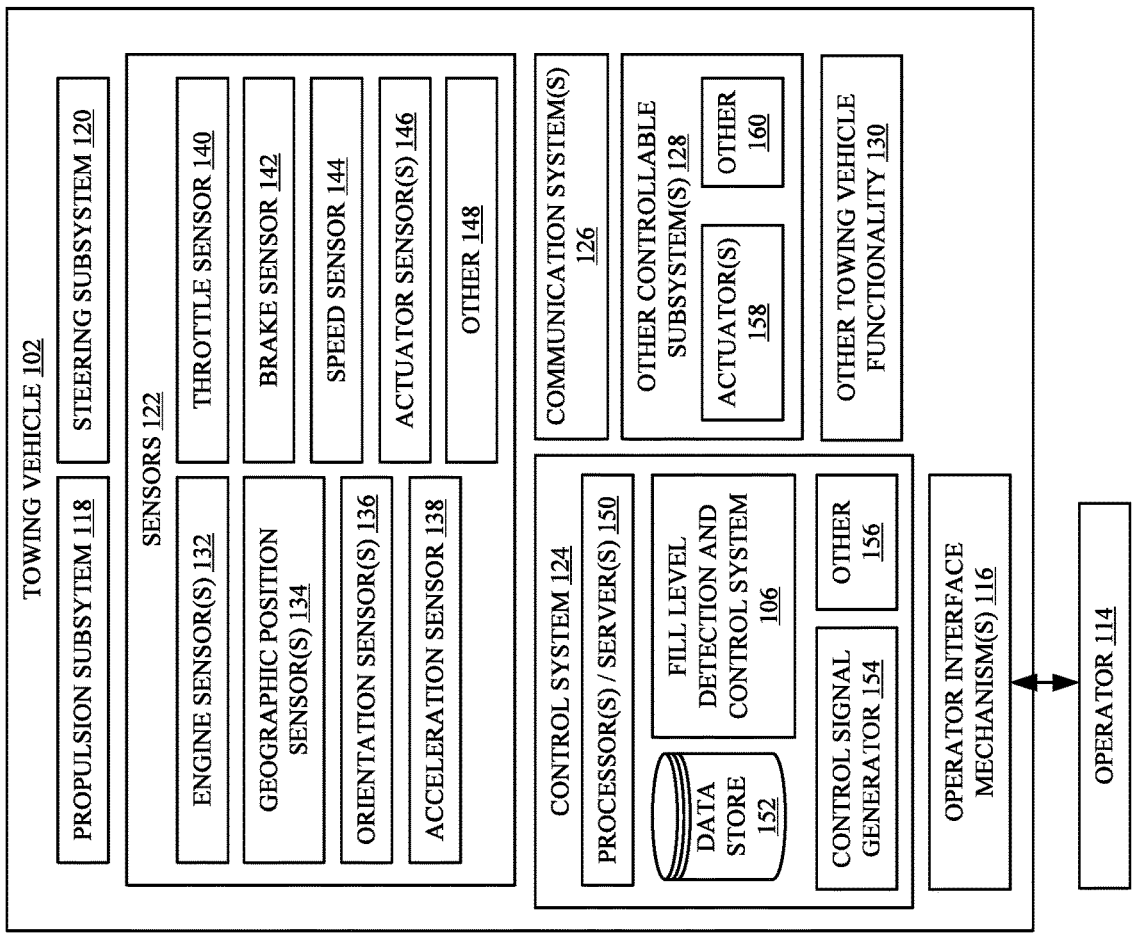
FIG. 2 is a block diagram showing one example of a towing vehicle in more detail.

FIG. 2 is a block diagram showing one example of towing vehicle 102, in more detail. In the example shown in FIG. 2, towing vehicle 102 is operated by an operator 114. Operator 114 illustratively interacts with operator interface mechanisms 116 on vehicle 102 in order to control vehicle 102, and possibly some functionality on wagon 104.

In the example shown in FIG. 2, towing vehicle 102 includes a propulsion subsystem 118, a steering subsystem 120, a set of sensors 122, control system 124, one or more communication systems 126, other controllable subsystems 128 and it can include a wide variety of other towing vehicle functionality 130. In the example shown in FIG. 2, sensors 122 can include engine sensors 132, which sense a wide variety of different engine parameters. They can include one or more geographic position sensors 132, such as a global positioning system (GPS) receiver or another position sensor. They can include one or more orientation sensors 136, one or more acceleration sensors 138, a throttle sensor 140 (that senses the position and movement of a throttle on towing vehicle 102) break sensor 142 (that senses the position and movement of a break actuator on towing vehicle 102) a speed sensor 144 (which can be a wheel speed sensor, a sensor that senses or calculates speed based upon changes in geographic position sensed by sensor 134 over time, or another speed sensor), one or more actuator sensors 146 (that sense the actuation of various actuators on towing vehicle 102), or they can include a wide variety of other sensors 148.

Control system 124 illustratively includes one or more processors or servers 150, data store 152, control signal generator 154, and it can include other items 156. In the example shown in FIG. 2, fill level detection and control system 106 is also shown as being part of control system 124, although it can be separate, as discussed above.

Other controllable subsystems 128 can include one or more actuators 158, and other items 160. Before describing the operation of architecture 100 (and towing vehicle 102) in more detail, a brief description of some of the items in towing vehicle 102, and their operation, will first be provided.

Propulsion subsystem 118 illustratively drives movement of ground engaging elements (such as wheels or tracks) on towing vehicle 102. Steering subsystem 112 illustratively steers vehicle 102 based upon operator inputs from operator 114.

Operator interface mechanisms 116 can include a wide variety of different types of mechanisms. For instance, they can include a steering wheel, joysticks, peddles, levers, push buttons, audio interface mechanisms, haptic interface mechanisms, visual interface mechanisms, linkages, a microphone (where vehicle 102 includes speech recognition components), and other things. Operator interface mechanisms 116 can also include a touch sensitive display device so that user input mechanisms can be displayed and actuated on the display device. By way of example, the user input mechanisms may include icons, links, buttons, or items that may be actuated on the display using a point and click device, using a touch gesture, or other items.

Communication systems 126 illustratively include one or more systems that can communicate among items on towing vehicle 102, with items on wagon 104 (such as with an actuator that dumps or unloads wagon 104) and over network 112. Therefore, communication systems 126 can include one or more systems that enable the type of communication that is used on towing vehicle 102 (e.g., over a controller area network-CAN-bus) that is used to communicate with wagon 104 over link 113, and that is used to communicate over network 112.

Other controllable subsystems 128 can include a wide variety of different types of actuators 158. They can be actuated to perform functions on towing vehicle 102, or they can provide actuation of some elements on wagon 104.

Control system 124 illustratively receives inputs from one or more sensors 122 and operator 114 (and it can receive other inputs) and uses control signal generator 154 to generate control signals that are used to control propulsion subsystem 118, steering subsystem 112 and any other controllable subsystems 128. Control signal generator 154 can also generate control signals that are used to control certain elements on wagon 104.

Fill level detection and control system 106 illustratively receives sensor inputs from one more sensors 122 and identifies a fill level indicating how full wagon 104 is of the agricultural material that it is carrying. In one example, it does this by receiving sensor inputs and other inputs that can be used to identify a time of high dynamic change in vehicle 102. For instance, it may identify a time during which vehicle 102 is making a relatively drastic acceleration, or deceleration, or when vehicle 102 is entering a portion of the field (over which it is traveling) that is uphill or downhill. When this type of dynamic change is detected, fill level detection and control system 106 illustratively monitors various sensor inputs or other inputs to generate a metric indicative of an estimated fill level of wagon 104.

For instance, it may be that fill level detection and control system 106 detects a change in the throttle position indicating that vehicle 102 is to accelerate. It can then detect a time over which the expected acceleration takes place. This time will illustratively vary based upon how full wagon 104. This is because the mass of the wagon 104, and its load, will be increased over the mass of the wagon 104, when it was empty. By comparing the time over which the expected acceleration takes place, with the time that the acceleration would take place if wagon 104 were empty, the combined mass of agricultural material being carried by wagon 104 can be estimated, and this can be used to estimate the fill level of wagon 104. In making that estimation, system 106 can obtain a default value indicative of the mass per unit volume of the agricultural material, or that value can be calculated or otherwise identified based on an operator input, or based on an input indicating the moisture level of the agricultural material, among other things. Fill level detection and control system 106 can then output a metric indicative of the estimated fill level, and indicative of the confidence associated with that metric, and indicative of a variety of other things. The fill level detection and control system 106 is described in greater detail below with respect to FIG. 3.

Control signal generator 154 can generate a variety of different types of control signals (or action signals) based upon the fill level metric output by system 106. For instance, it can control an operator interface mechanism 116 to provide an indication to operator 114 of the fill level. It can also control communication system 126 to communicate with the operator of another towing vehicle 102 indicating the need for additional wagons 104, when the current wagon is nearly full. It can control communication system 126 to communicate with remote systems 110, as discussed above, or it can control various other items as well.

Figure 3:
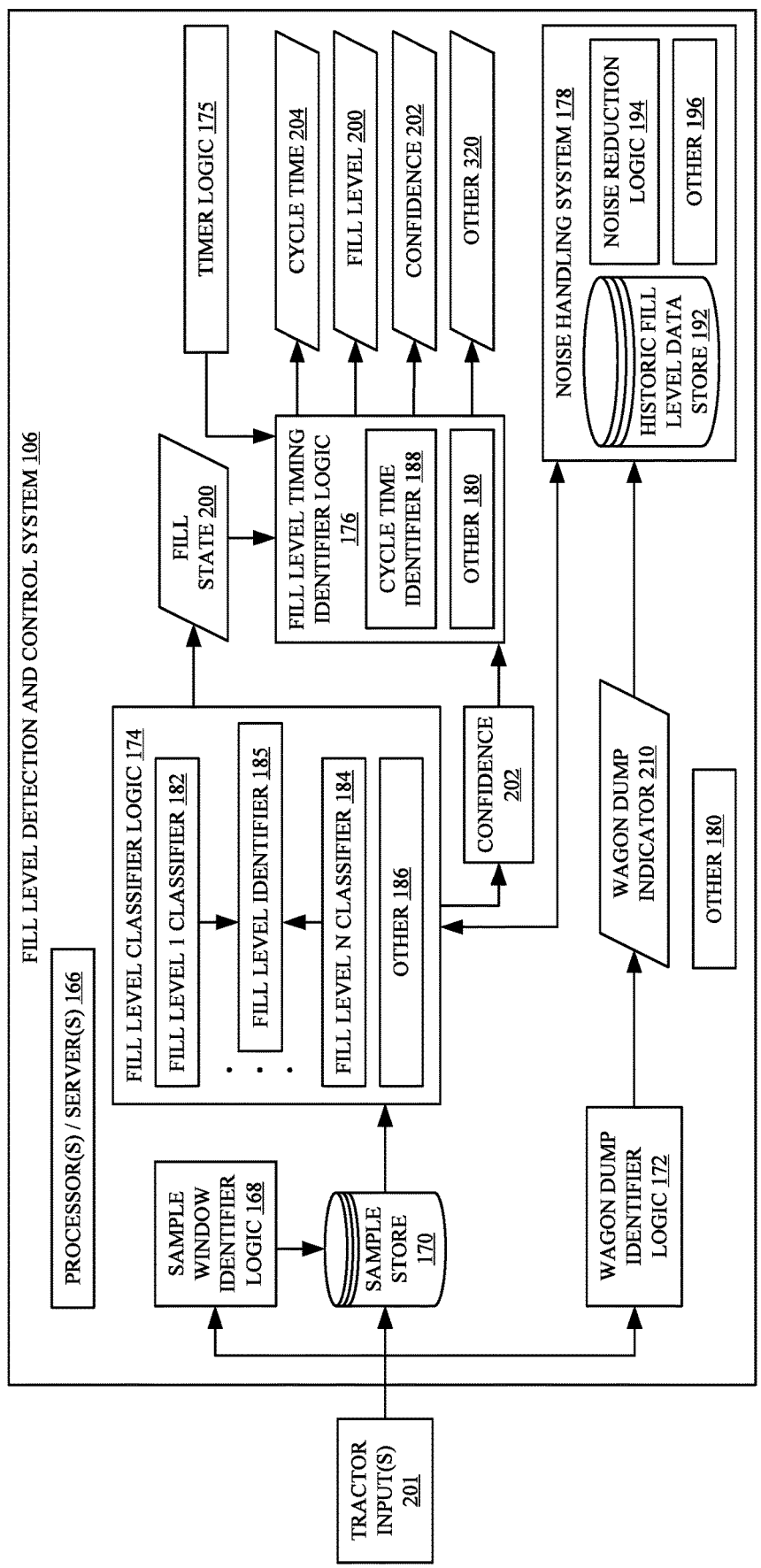
FIG. 3 is a block diagram showing one example of a fill level detection and control system in more detail.

FIG. 3 is a block diagram showing one example of fill level detection and control system 106, in more detail. In the example shown in FIG. 3, system 106 can include one or more processors or servers 166 (which can be the same as processors or servers 150 or different), sample window identifier logic 168, sample store 170, wagon dump identifier logic 172, fill level classifier logic 174, timer logic 175, fill level identifier logic 176, noise handling system 178, and it can include a wide variety of other items 180. Fill level classifier logic 174 can include a set of fill level classifiers 182-184 (which may include a fill level classifier for different levels 1-N corresponding to different fill levels of wagon 104). Logic 174 also includes fill level identifier 185. Logic 174 can include other items 186 as well. Fill level timing identifier logic 176 illustratively includes cycle time identifier 188, and it can include other items 190. Noise handling system 178 can include historical level data store 192, noise reduction logic 194, and it can include a wide variety of other items 196.

Briefly, by way of overview, sample store 170 receives various tractor inputs 201, from the various sensors 122 on towing vehicle 102. That data is stored in sample store 170. Then, the system (e.g., tractor and wagon) response to a defined control input is measured and compared to an expected response and the difference is classified to identify how full the wagon is.

For example, sample window identifier logic 168 (as is described in greater detail below with respect to FIG. 4) illustratively identifies a time of high dynamic change in the operation of vehicle 102, based up on the tractor inputs 201. It uses that identified time of high dynamic change in order to separate the data in sample store 170 into sample windows corresponding to the data taken during the time of high dynamic change.

The time of high dynamic change illustratively identifies a time during which the acceleration of towing vehicle 102 changes in a measurable way. For instance, when operator 114 moves the throttle from a first position to a second position (the defined control input), this can be detected by throttle sensor 140, and it indicates a time during which vehicle 102 will likely accelerate (the system response), assuming that the ground is relatively level. The time that it takes for vehicle 102 to accelerate from its current speed, to a second, higher speed (a characteristic of the system response), can then be measured. This information (and possibly other information, such as time delay, terrain slope, speed overshots, etc.) can then be provided to fill level classifier logic 174 as part of the acceleration behavior.

Each of the fill level classifiers 182-184 illustratively corresponds to a different fill level and generates an output indicative of how closely the acceleration data matches that for the corresponding fill level. By way of example, the time during which the acceleration takes place when wagon 104 is empty may already be known. Similarly, the acceleration data corresponding to when wagon 104 is filled to a first level, a second level . . . an Nth level, may be known as well. Thus, each of the classifiers 182-184 correspond to a different one of those fill levels (fill levels 1-N) and generates an output indicative of how closely the acceleration data matches the acceleration data for its corresponding fill level. These metrics are output to fill lever identifier 185.

Fill level identifier 185 then identifies the particular fill level that the current acceleration data matches most closely. Also, in the event that the current acceleration data is between two of the classified fill levels, fill level identifier 185 may blend those two fill levels to identify a fill level that is between them. It then outputs a fill state 200 indicative of the fill level that the current acceleration data most closely matches, along with a confidence score 202 indicating how confident fill level identifier 185 is in that fill level or fill state 200.

Fill level timing identifier logic 176 then uses cycle time identifier 188, and timer logic 175, to identify a likely cycle time over which wagon 104 was filled (e.g., the time between dump operations for wagon 104). It may provide the fill level 200, the confidence 202, and the cycle time 204, and other logistic information, at its output. These items may be input to control signal generator 154 where they are used to generate control signals. For instance, if the fill level 200 indicates that wagon 104 is nearly full, and the cycle time 204 indicates that the wagon 104 should be dumped relatively soon, then control signal generator 154 may generate a control signal to control communication system 126 to notify the operator of another towing vehicle that another wagon is needed at the harvester. This is just one example.

In another example, noise handling system 178 generates signals that can be used to reduce noise (and increases accuracy) in the fill level or fill state 200 output by fill level classifier logic 174. By way of example, it may be that wagon dump identifier logic 172 has monitored actuator signals or other signals on vehicle 102 to determine when the wagon 104 was last dumped or unloaded. It generates a wagon dump indicator 210 indicative of this. If wagon 104 has not been dumped since the last fill level was calculated and output by fill level classifier logic 174, then this means that the next fill level should at least be the same or higher than the previous fill level. Therefore, fill levels can be stored in historic fill level data store 192, and noise reduction logic 194 compares the current fill level that was most recently generated, with the next previous fill level (to ensure that it is at least as high as the next previous fill level, assuming that the wagon 104 has not been dumped in the meantime. If the current fill level is lower, than this may mean that the current fill level was not calculated accurately, or was corrupted or affected by noise. Thus, noise reduction logic 194 can compare the fill levels across different sample windows, and can also consider when the wagon 104 was last dumped or unloaded, to ensure that the currently generated or identified fill level is relatively accurate. If it is not, it can be rejected, or otherwise processed based on its likely inaccuracy.

Figure 4:
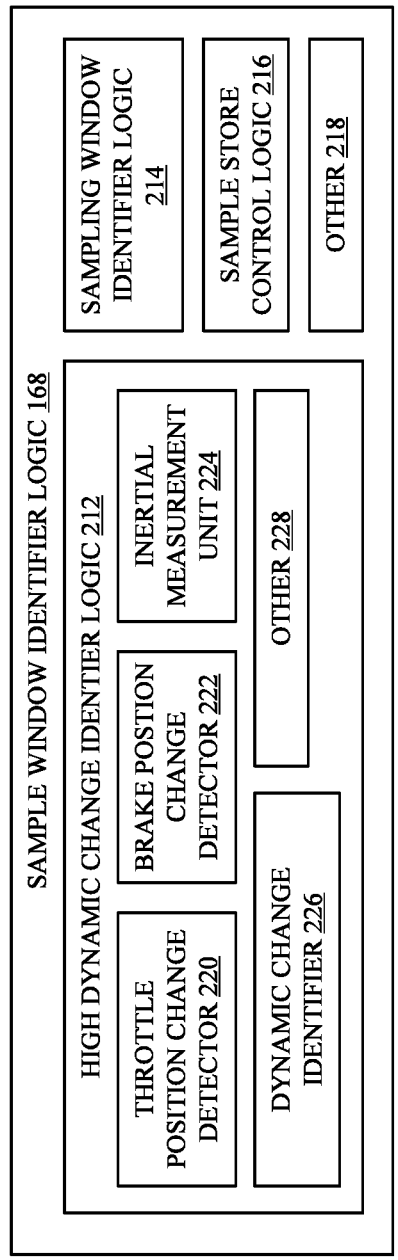
FIG. 4 is a block diagram showing one example of a sample window identifier in more detail.

FIG. 4 is a block diagram showing one example of sample window identifier logic 168, in more detail. It can be seen in FIG. 4 that logic 168 illustratively includes high dynamic change identifier logic 212, sampling window identifier logic 214, sample store control logic 216, and it can include other items 218. High dynamic change identifier logic 172 illustratively includes throttle position change detector 220, brake position change detector 222, and inertial measurement unit (or other linear and angular motion sensor) 224, dynamic change identifier 226, and it can include a wide variety of other items 228. The throttle position change detector and brake position change detector 220 and 222, respectively, can receive the sensor signals from throttle sensor 140 and brake sensor 142 and identify a change in the position, based upon those sensor signals. Inertial measurement unit 224 can also identify a change in the linear and angular motion of vehicle 102, to indicate whether it is in a time of high dynamic change such as accelerating, decelerating or going uphill, downhill, etc. Dynamic change identifier logic 226 can use the signals output by detectors 220, 222, and/or 224, as well as a change in speed identified by speed sensor 144, or a change in acceleration indicated by acceleration sensor 138, or a wide variety of other inputs from sensors 122, to identify a time during which there is a high dynamic change in the movement of vehicle 102. This can be done, for instance, by comparing the acceleration of vehicle 102 to a threshold acceleration, by comparing the change in the speed of vehicle 102 to the threshold speed change, by identifying a time during which the throttle was moved by a threshold amount within a threshold time period, by identifying an amount of force exerted by the operation of the brake pedal, or in a wide variety of other ways.

Once a high dynamic change has been identified by logic 212 and dynamic change identifier 226, then the beginning and the end of that high dynamic change period are identified by sample window identifier logic 214 as a sample time window. The data captured by the sensors during the sample time window can be used to detect the fill level of wagon 104. This sample data can thus be output to fill level classifier logic 174.

Figure 5A:
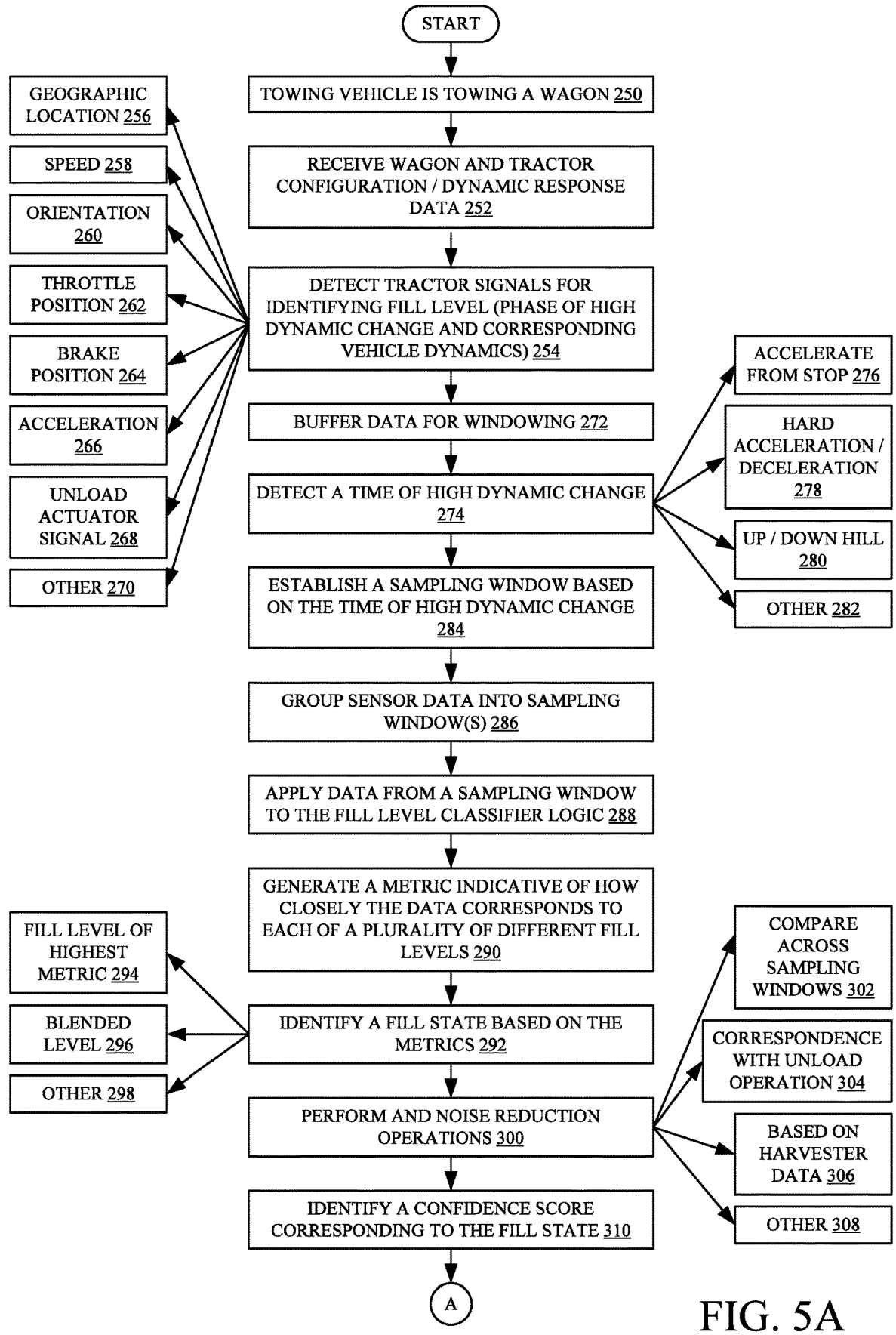
FIGS. 5A and 5B (collectively referred to as FIG. 5) show a flow diagram illustrating one example of the operation of the fill level detection and control system detecting a wagon fill level.
Figure 5B:
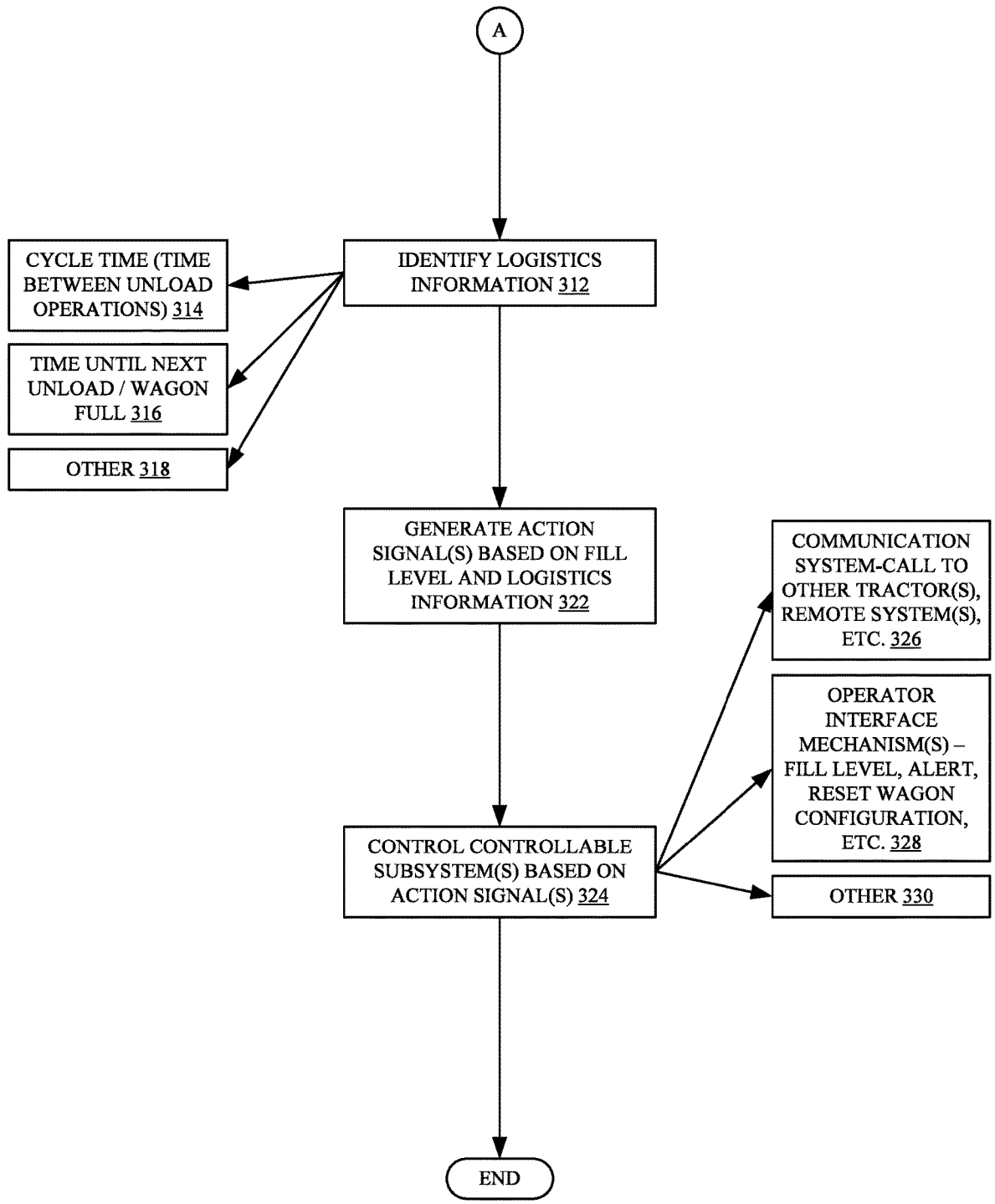

FIGS. 5A and 5B (collectively referred to herein as FIG. 5) show a flow diagram illustrating one example of the operation of architecture 100 (and specifically of fill level detection and control system 106) in identifying a fill level of wagon 104, in more detail. Is first assumed that towing vehicle 102 is towing a wagon 104. This is indicated by block 250 in the flow diagram of FIG. 5. At some point, fill level detection and control system 106 receives the wagon and tractor configuration/dynamic response data. This is indicated by block 252. By way of example, system 106 can receive the capacity of wagon 104, its empty weight, the dynamic information indicative of how wagon 104 and tractor 102 respond to different throttle or brake changes at different fill levels, the identity/model and configuration of tractor 102 and wagon 104, and/or any other information. It will also be assumed that fill level classifier logic 174 has received the dynamic information indicative of how this particular model and configuration of tractor 102 and wagon 104 respond dynamically to high dynamic change scenarios at different fill levels. For instance, that information can be represented by the particular fill level classifiers 182-184 in logic 174. The dynamic information indicates, for instance, how tractor 102 and wagon 104 respond to changes in throttle or brake position, to changes in the topology (e.g., when they start going uphill or downhill), at different fill levels. Then, during the real time (or near real time) fill level detection, the dynamic information can be measured and classified by classifiers 182-184 using the known information to determine how closely the real time (or near real time) dynamic information matches that corresponding to the different fill levels, represented by classifiers 182-184.

It will be noted that fill level classifier logic 174 can use any of a wide variety of classification mechanisms. For instance, it can use fuzzy logic classifiers, neural networks, decision trees, etc.

The various sensors 122 and other items on tractor 102 then detect tractor signals that are used for identifying the fill level of wagon 104. These signals can include signals that are used by high dynamic change identifier logic 212 to identify a sample window, and they can include information characterizing the dynamic operation or motion of the tractor 102 and wagon 104. This is indicated by block 254 in the flow diagram of FIG. 5. The signals can include, for instance, geographic location 256, speed 258, orientation 260, throttle position 262, brake position 264, acceleration 266, the state of the unload actuator signal 268, and it can include a wide variety of other signals 270. This information is received and buffered in sample store 170 of fill level detection and control system 106. Buffering the data is indicated by block 272 in the flow diagram of FIG. 5.

Sample window identifier logic 168 then identifies a sample window for the data in sample store 170. To do so, high dynamic change identifier logic 212 uses various detectors 222-224 to detect different signals that may be indicative of a high dynamic change scenario. Dynamic change identifier 226 then identifies one or more a time periods of high dynamic change for tractor 102 and wagon 104. This is indicated by block 274. The times of high dynamic change may include, for instance, a relatively rapid acceleration from a stop, as indicated by block 276, a hard acceleration or deceleration as indicated by block 278, transitioning from one gradient to another (such as beginning to go uphill or downhill) as indicated by block 280, or any of a wide variety of scenarios where a high dynamic change in motion is detected. This is indicated by block 282.

Based on the time period identified (as a period of high dynamic change), sampling window identifier logic 214 then establishes a sampling window. This is indicated by block 284. For instance, it can identify the beginning and end of the period of high dynamic change.

Sample store control logic 216 then controls sample store 170 to identify the sensor data gathered or detected during the identified sampling windows. This is indicated by block 286. For instance, assume that tractor 102 and wagon 104 accelerated quickly during a first 30 second time window. Then, assume that they transitioned from moving on a relatively flat ground to going up a relatively steep hill, and this transition (the time taken for the tractor to reach a constant speed once it begins going uphill) corresponds to another 30 second time window. Assume also that those two time windows are identified as periods of high dynamic change. In that case, sample store control logic 216 identifies the data in sample store 170 that was taken during those two 30 second time widows and uses that data as data from a sampling window for which the fill level of wagon 104 can be identified.

Logic 168 then applies the data from the sampling window (or windows) to fill level classifier logic 174. This is indicated by block 288 in the flow diagram of FIG. 5. Each of the fill level classifiers 182-184 then generate a metric, and output the metric. The metric indicates how closely the data from the sampling window matches the data expected for the corresponding fill level represented by the particular fill level classifier 182-184 that generates the metric. In one example, the metrics range between a value of 0 and a value of 1, where 0 means that the data has no statistically significant match to the corresponding fill level, and 1 means that the data matches the corresponding fill level perfectly. Generating a metric indicative of how closely the data in the sampling window corresponds to each of a plurality of different fill levels, using the fill level classifiers 182-184, is indicated by block 290 in the flow diagram of FIG. 5.

The various metrics are output to fill level identifier 185 which identifies which particular fill level will be chosen, based upon the metrics generated by the different fill level classifiers 182-184. Fill level identifier 185 identifies a fill state based on the various metrics. For instance, it can identify the fill state corresponding to the fill level classifier 182-184 that generated the highest metric. It can also identify an intermediate fill state (between two different fill levels, where two different classifiers 182-184 generated metrics that are within a threshold value of one another). For instance, if one of the fill level classifiers 182 generated a metric of 0.4 and next adjacent fill level classifier generated a metric of 0.4, then fill level identifier 185 may blend those values to generate a fill state that is between the two fill levels corresponding to those two fill level classifiers. For instance, where the first fill level classifier corresponds to a fill level of ½ full, and the second fill level classifier corresponds to a fill level of ¾ fill, fill level identifier 185 may output a fill state indicating that wagon is between ½ full and ¾ full (e.g., ⅝ full). Based upon a blended combination of the two metrics. Identifying a fill state based on the metrics is indicated by block 292. Identifying the fill level corresponding to the highest metric value is indicated by block 294. Identifying a blended fill level is indicated by block 296, and identifying the fill level in another way is indicated by block 298.

In identifying the fill level, fill level identifier 185 take into account any noise reduction operations based on information provided by noise reduction logic 194 in noise handling system 178. Performing the noise reduction operations is indicated by block 300 in the flow diagram of FIG. 5.

In one example, historic fill level data store 192 stores the fill levels corresponding to a most recent set of sample windows. It also illustratively maintains an unload state identifying when wagon 104 was most recently unloaded or dumped. Therefore, in one example, noise reduction logic 194 illustratively compares the current fill level identified by fill level identifier 185 with a most recent prior fill level (or a set of most recent fill levels) that were previously identified. It can then determine whether the current fill level is drastically different than the set of previously identified fill levels. If so, it may be that it is an outlier and was generated under noisy conditions and can be discarded as noise. Comparing fill levels from different sampling windows to perform noise reduction is indicated by block 302.

Noise reduction logic 194 can perform noise reduction based on the dump or unload signal which is generated to identify a dump or unload operation performed by wagon 104. For instance, if the current fill level is not at least the same as, or larger than, the most recent previous level, then assuming that wagon 104 has not been dumped or unloaded in the meantime, the current fill level is likely corrupted by noise. If, on the other hand, the current fill level is higher than the most recent previous fill level, but wagon 104 has been dumped or unloaded in the meantime, then, again, the current fill level is likely corrupted by noise. Performing noise reduction based on when the wagon was unloaded is indicated by block 304 in the flow diagram of FIG. 5.

Noise reduction logic 194 can also perform a variety of other noise reduction steps as well, if it obtains information from one or more of the harvesters that are loading agricultural material into wagon 104. Performing this type of noise reduction is indicated by block 306 in the flow diagram of FIG. 5, and some examples of it are discussed in greater detail below with respect to FIGS. 6 and 7. Noise reduction can be performed in a wide variety of other ways as well, and this is indicated by block 308.

Once the current fill level has been identified, and any noise reduction operations have been performed, then fill level identifier 185 identifies a confidence score corresponding to the fill state or fill level that was identified. This is indicated by block 310. The confidence score can be based on the level of the metric identified by the various fill level classifiers 182-184, or it can be generated by each of the fill level classifiers 182-184 and used by fill level identifier 185, or it can be generated in other ways as well.

The fill state (or fill level) 200 and the confidence score 202 are illustratively output to fill level timing identifier logic 176 which can generate logistics information, based upon the fill state or fill level 200 and confidence 202. Identifying logistics information is indicated by block 312 in the flow diagram of FIG. 5, and it can take a wide variety of different forms. For instance, timer logic 175 can provide timing information to cycle time identifier 188 in fill level timing identifier logic 176. Cycle time identifier 188 can then identify the cycle time (the time it takes between dump operations of wagon 104). Identifying the cycle time 204 is indicated by block 314 in FIG. 5. Fill level timing identifier logic 176 can also identify an expected time until the next unload operation will be performed, or until wagon 104 is full. This is indicated by block 316 in the flow diagram of FIG. 5. Fill level timing identifier logic 176 can generate a wide variety of other logistical information as well, and this is indicted by block 318.

In one example, the cycle time 204, fill level 200, confidence score 202 and other information 320 can be output to control signal generator 154 which generates action signals (or control signals) based on the fill level and the logistics information. This is indicated by block 322 in the flow diagram of FIG. 5. The control signal generator 154 then applies those action signals (or control signals) to various systems or subsystems to control them based on the action signals (or control signals). This is indicated by block 324 in the flow diagram of FIG. 5.

For example, control signal generator 154 can control communication system 126 to call the operators of other tractors to indicate that wagon 104 is almost full, and that another wagon is needed. It can also call a remote system 110 (such as that of a dispatcher) which can be used to dispatch resources to the site of harvesting. For instance, it may be a dispatcher that is used to send semi-trucks to receive wagon loads of agricultural material from wagon 104. It may be a dispatcher that dispatches tractors and wagons among various harvesting sights. It may be a dispatcher that notifies a mill or other processing facility of the level of agricultural material that is on the way for processing. Controlling the communication system 126 to communicate with other operators or remote systems is indicated by block 326 in the flow diagram of FIG. 5.

Control signal generator 154 may also control operator interface mechanisms 116 in a wide variety of different ways. For instance, it can display the fill level of wagon 104. It can display an alert, etc. By way of example, it may be that wagon 104 is being overfilled. In that case, control signal generator 154 can control an alert operator interface mechanism 116 alerting the operator to this fact. It may be that the wagon configuration information that is received by fill level detection and control system 106 indicates that wagon 104 has a first capacity. However, each time the wagon is dumped, it may unload a second capacity, that is higher than the first capacity. In that case, control signal generator 154 may control an operator interface mechanism 116 instructing the operator to re-enter the wagon configuration information, because the capacity entered by the operator originally must have been too low. Controlling the operator interface mechanisms is indicated by block 328. It will be noted that these are only examples of various control signals that can be generated, and a wide variety of others can be generated as well. This is indicated by block 330.

Figure 6:
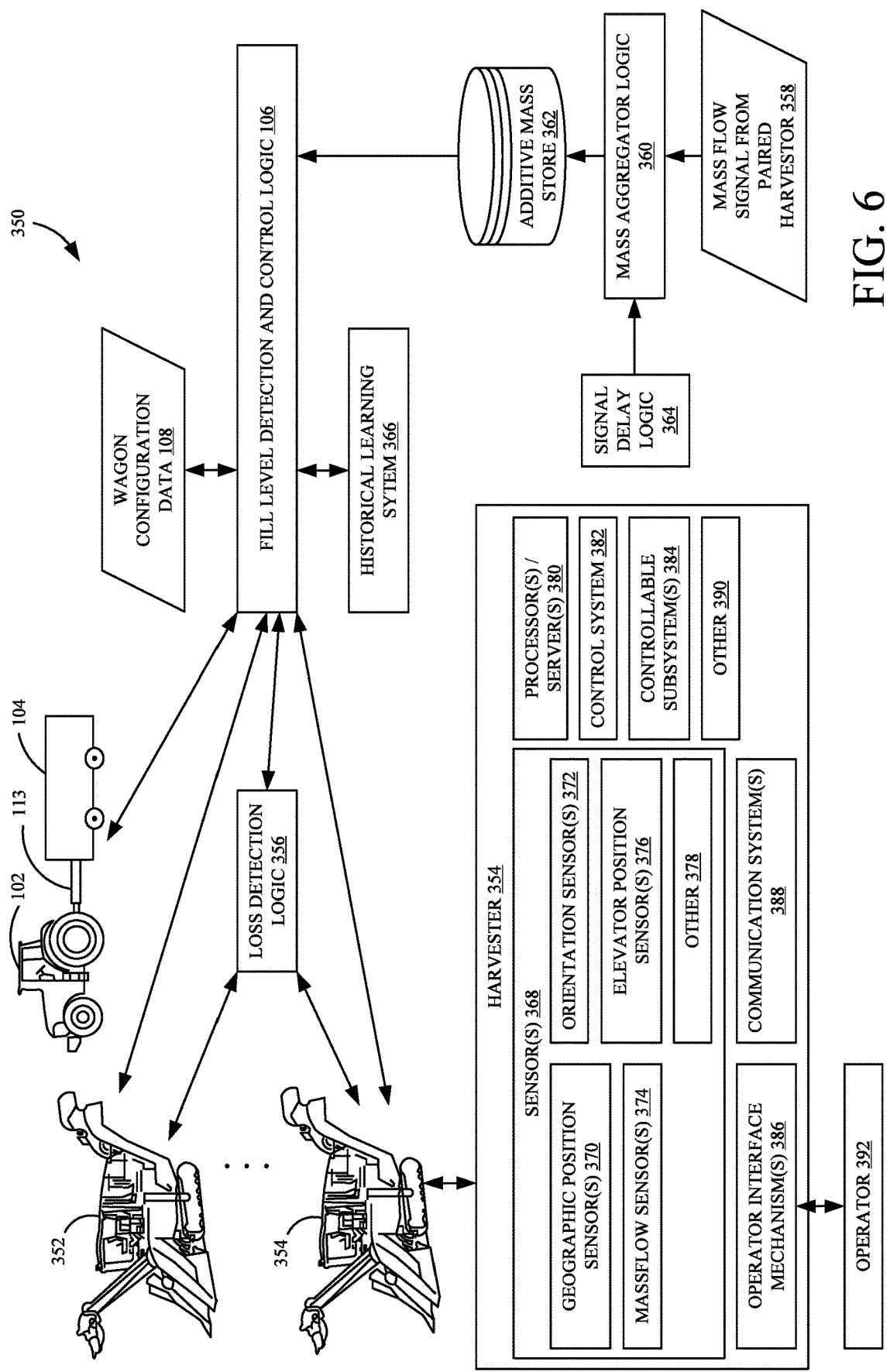
FIG. 6 is a partial block diagram, partial pictorial diagram of another towing vehicle architecture.

FIG. 6 is a block diagram showing one example of another architecture 350. It can be seen that some of the items in architecture 350 are similar to those shown in architecture 100 (illustrated in FIG. 1) and they are similarly numbered. FIG. 6 also shows, however, that in some examples, fill level detection and control logic can receive inputs from one or more harvesters 352-354 (the loading vehicles that load the material into the wagon 104) that may be working with tractor 102 and wagon 104. Also, fill level detection and control logic 106 may receive an input from loss detection logic 356 that generates a metric indicative of agricultural material loss by one or more harvesters 352-354. Further, it may be that a mass flow 358 signal from one or more harvesters 352-354, can be provided to mass aggregator logic 360 which aggregates the mass being loaded by a harvester into wagon 104 based on the mass flow signal. That mass can be added and stored in additive mass store 362, and used for noise reduction by fill level detection and control logic 106.

In aggregating the mass of agricultural material based on the mass flow signal, mass aggregator logic 360 illustratively receives a signal from signal delay logic 364 that indicates the material travel time that it takes for the agricultural material to move from the mass flow sensor (wherever it is located on harvester 352) to wagon 104. Therefore, mass aggregation logic 360 can generate a measure indicative of the mass of agricultural material that is purportedly loaded from a harvester 352 into wagon 104. This value can be stored in additive mass store 362 and used by fill level detection and control logic 106. Also, loss detection logic 356 can generate a loss metric indicative of an amount of that agricultural material that was lost by harvester 352 (e.g., the amount that may have been detected by the mass flow sensor, but the was lost before it was loaded into wagon 104). The loss metric can also be used by fill level detection and control logic 106. This is described in greater detail below with respect to FIG. 7.

Figure 7:
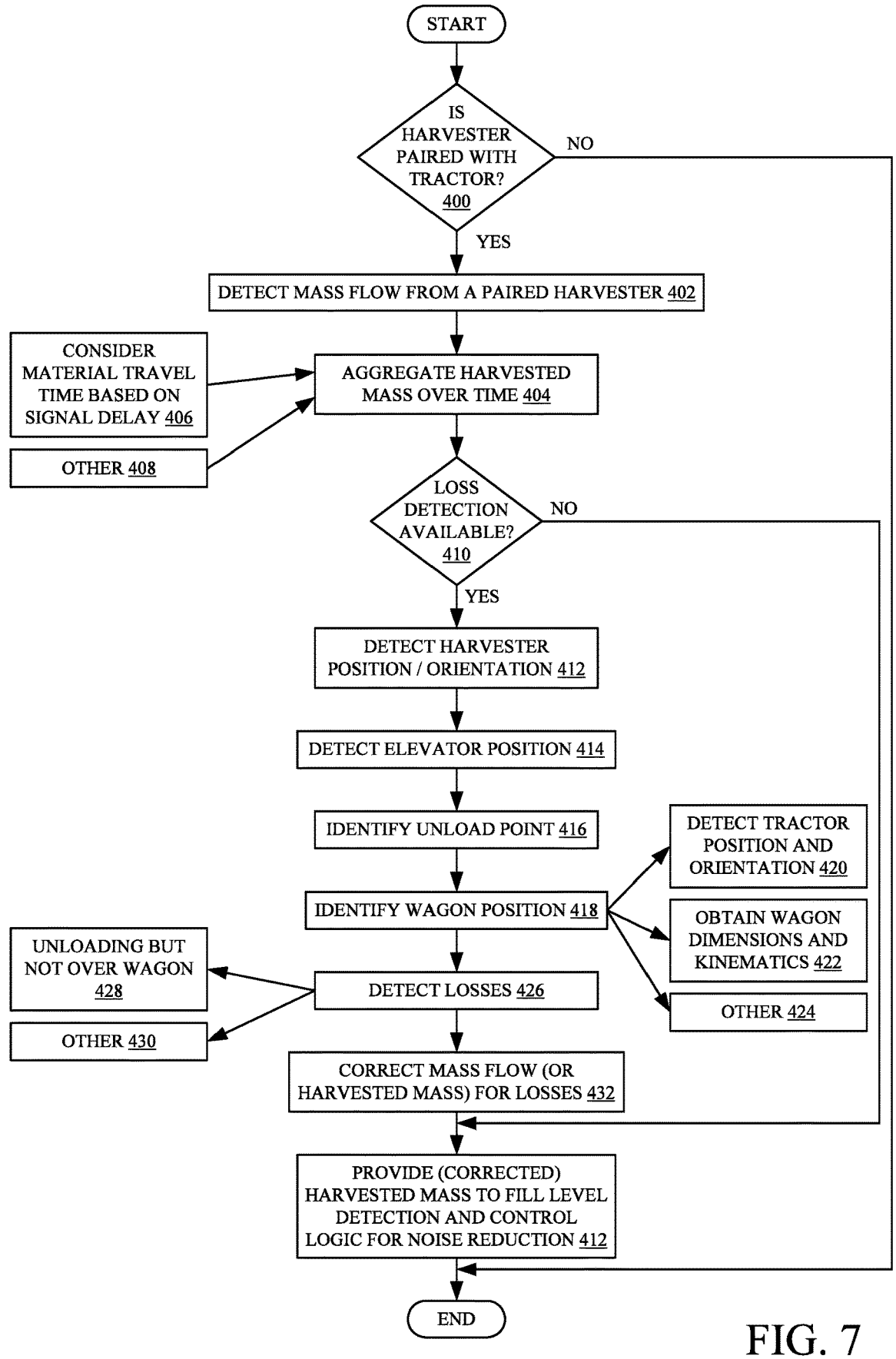
FIG. 7 is a flow diagram illustrating one example of performing noise reduction operations based on a harvester input.

Before describing FIG. 7, however, it will also be noted that FIG. 6 shows that historical learning system 366 can be incorporated into architecture 350. Historical learning system 366 may learn the wagon configuration data 108, over time. Therefore, even if the wagon configuration information is entered by the operator or retrieved in another way, it may be incorrect. In that case, historical learning system 366 can learn the wagon configuration data over time, based upon the actual mass of agricultural material unloaded from wagon 104 during one or more unload operations, or the mass that is actually loaded into wagon 104 prior to those unload operations. If the actual capacity, for instance, of wagon 104 differs from the entered value, then historical learning system 366 can generate a signal indicating that the wagon configuration data 108 should be changed. Also, even where no wagon configuration data 108 is initially entered or retrieved, it can be automatically learned by system 366 and used in estimating the fill level of wagon 104.

Before describing the overall operation of the items in architecture 350 in performing noise reduction, a brief description of one example of a harvester will first be provided. FIG. 6 shows that, in one example, harvester 354 includes a set of sensors 368. The sensors can include a geographic position sensor 370, an orientation sensor 372, one or more mass flow sensors 374, elevator position sensor 376, and it can include a wide variety of other sensors 378. The harvester can include one or more processors or servers 380, a control system 382, one or more controllable subsystems 384, operator interface mechanisms 386, one or more communication systems 388, and it can include a wide variety of other items 390.

Operator 392 can interact with operator interface mechanisms 386 in order to control and manipulate various items of harvester 354. Control system 382 can receive operator inputs and inputs from sensors 368 and other items, and generate control signals to control the controllable subsystems 384. The controllable subsystems 384 may include an elevator positioning subsystem that positions the elevator on harvester 354 between an unloading position for unloading into wagon 104 and a storage position. It can include a propulsion system, a steering system, various material processing systems, etc. Geographic position sensor 370 illustratively senses a geographic position of the harvester. Orientation sensor 372 senses an orientation of the harvester, and mass flow sensor 374 senses a mass flow of agricultural material through the harvester at some point (such as through the elevator, etc.). Elevator position sensor 376 senses the position of the elevator relative to the frame of harvester 354. In this way, the location of the spout of the elevator (the portion that unloads the agricultural material into wagon 104) can be identified as well.

FIG. 7 is a flow diagram illustrating one example of the operation of noise handling system 178 (shown in FIG. 3) with the additional inputs from one or more harvesters 352-354. These operations are examples of those mentioned above with respect to block 306 in FIG. 5. It is first determined whether a harvester is paired with the tractor 102 that is pulling wagon 104. If not, then the additional information will not be received from a harvester, and so the additional noise reduction steps need not be performed. Determining whether a tractor is paired with a harvester is indicated by block 400 in the flow diagram of FIG. 7.

If it is determined at block 400 that the tractor 102 is paired with one or more harvesters, then fill level detection and control logic 106 illustratively detects the mass flow from the paired harvester by receiving the mass flow signal 358 (or another representation of mass flow) from the paired harvester. This is indicated by block 402. Mass aggregator logic 360 uses the signal from signal delay logic 364 to identify a mass flow of agricultural material as it is exiting the harvester. This will include considering the material travel time between the mass flow sensor and the exit point (or spout) of the elevator on the harvester. It aggregates the mass of material exiting harvester 352 and stores it in additive mass store 362. Aggregating the harvested mass over time is indicated by block 404. Considering the material travel time based on the signal generated by signal delay logic 364 is indicated by block 406. The mass can be aggregated in other was as well, and this is indicated by block 408.

It may also be that material loss detection functionality may also be available. For instance, it may be that loss detection logic 356 is employed to detect an amount of material that exits the paired harvester 352, but does not make it into wagon 104. Determining whether loss detection is available is indicated by 410 in the flow diagram of FIG. 7. If not, then processing simply proceeds at block 412 where the aggregated mass stored in additive mass store 362 (and indicative of the mass of agricultural material unloaded from the paired harvester 352) is provided to fill level detection and control logic 106, and specifically to noise reduction logic 194, where it can be used to perform noise reduction. For instance, assuming that the mass of material that exists the paired harvester 352 is known, and that the wagon capacity is known, this can be correlated with the fill level of the wagon determined by fill level classifier logic 174. The two values should be correlated relatively closely, unless an error was made in generating one of the two values. This correlation can be used to determine whether the current fill level that was just identified is an outlier (e.g., is corrupted or affected by noise) and should be discarded or otherwise modified.

If, at block 410, it is determined that loss detection logic 356 is available, then loss detection logic 356 first determines the harvester position of the paired harvester 352, that is loading agricultural material into wagon 104. It can do this by receiving the geographic sensor signal generated by sensor 370, from the harvester as well as the orientation signal generated by orientation sensor 372. This will give a position and orientation of the paired harvester 352. Detecting this information is indicated by block 412 in the flow diagram of FIG. 7.

The loss detection logic 356 also illustratively detects the elevator position based on the elevator position signal from sensor 376. This will give the elevator position, relative to the frame of the paired harvester 352. Detecting elevator position is indicated by block 414.

From the elevator position and the position and orientation of harvester 352, the unload point (the geographic location of the spout of the elevator where the agricultural material is exiting the harvester) can be identified. This is indicated by block 416.

Loss detection logic 356 then identifies the position of wagon 104. This is indicated by block 418. The position of wagon 104 can be identified by detecting the position and orientation of tractor 102 based upon the signals from geographic position sensor 134 and orientation sensor 136 (shown in FIG. 2). Detecting the tractor position and orientation is indicated by block 420. Then, loss detection logic 356 can access the tractor and wagon dimensions and kinematic information (or a kinematic model) that was previously generated. This is indicated by block 422. Once the position and orientation of the tractor, as well as the dimensions and kinematic information corresponding to the tractor and wagon, are known, then the geographic location of the wagon is identified. It will be noted that identifying the wagon position can be done in other was as well and this is indicated by block 424.

Loss detection logic 356 then correlates the unload point of the harvester 352 with the geographic position of the wagon to determine whether the unload point is actually over the wagon. If not, this means that the mass of agricultural material unloaded when the unload point is not over the wagon will be lost. Thus, based upon the mass flow signal and the time during which the unload point and the geographic location of the wagon did not correspond to one another, agricultural material losses can be detected. Detecting losses is indicated by block 426 in the flow diagram of FIG. 7. Detecting the losses by identifying a mass where material was being unloaded, but not over the wagon 104, is indicated by block 428. Losses can be detected in other ways as well and this is indicated by block 430. The losses can also be provided back to the harvester to indicate the unloading loss.

Loss detection logic 356 then provides a loss metric (indicative of an amount of material lost) to fill level detection and control logic 106. Noise reduction logic 194 can use the loss metric to correct for the additive mass received from additive mass store 162, for losses. For instance, the additive mass stored in additive mass store 362 will represent the mass of agricultural product that was unloaded by harvester 352. However, where some of that agricultural material is lost, then the loss metric can be used to correct the additive mass stored in the data store 362. Correcting the aggregated mass flow for losses is indicated by block 432. Then, the corrected, harvested mass can be used by noise reduction logic 194 in the same way as is described above with respect to the uncorrected mass. However, the corrected mass will be a more accurate representation of the actual mass of agricultural material that was loaded into wagon 104 from the paired harvester 352.

The present discussion has mentioned processors and servers. In one example, the processors and servers include computer processors with associated memory and timing circuitry, not separately shown. They are functional parts of the systems or devices to which they belong and are activated by, and facilitate the functionality of the other components, logic, or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the Figures show a number of blocks with functionality ascribed to each block. It will be noted that fewer blocks can be used so the functionality is performed by fewer components. Also, more blocks can be used with the functionality distributed among more components.

Figure 8:
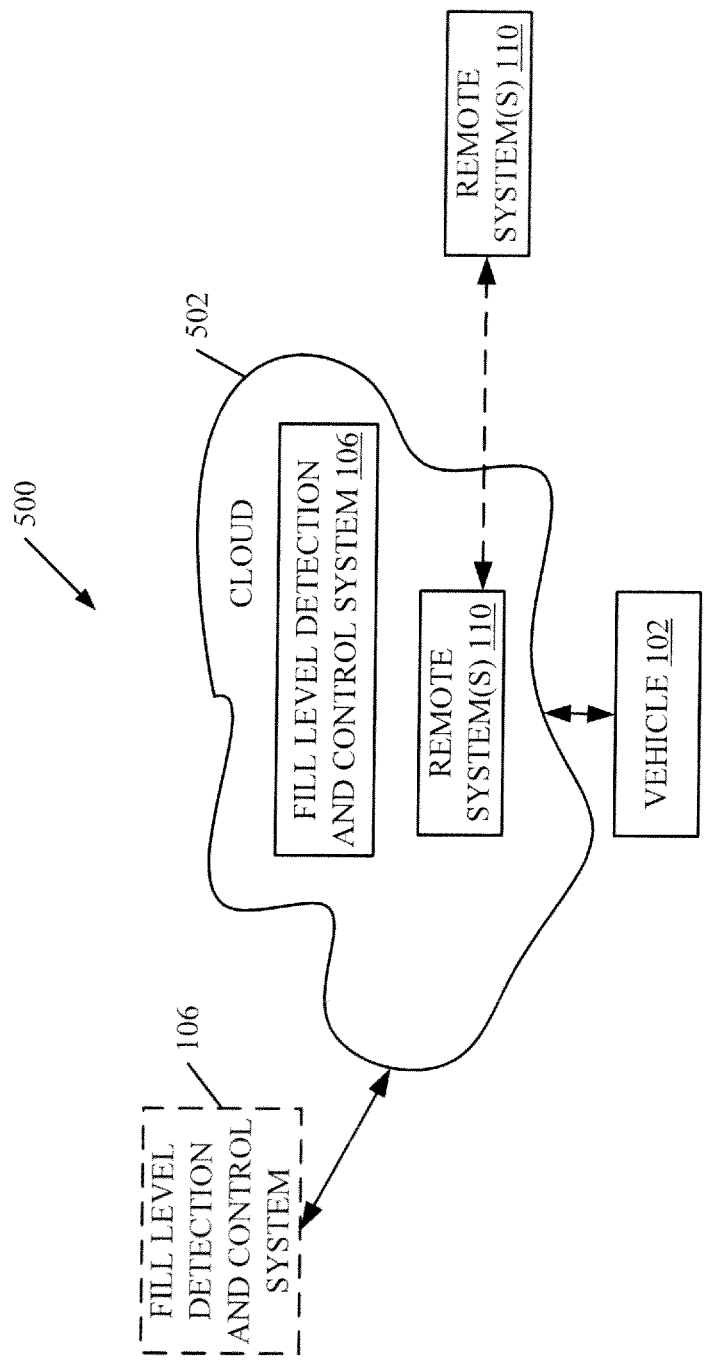
FIG. 8 shows the architecture illustrated in FIG. 1, deployed in a remote server architecture.

FIG. 8 is a block diagram of architecture 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous Figures as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components, logic and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIG. 1 and they are similarly numbered. FIG. 8 specifically shows that remote systems 110 can be located at a remote server location 502. Therefore, vehicle 102 accesses those systems through remote server location 502.

FIG. 8 also depicts another example of a remote server architecture. FIG. 8 shows that it is also contemplated that some elements of FIG. 1 are disposed at remote server location 502 while others are not. By way of example, fill level detection and control system 106 (or parts of it) and/or remote systems 110 can be disposed at location 502 or at a location separate from location 502, and accessed through the remote server at location 502. Regardless of where they are located, they can be accessed directly by vehicle 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the vehicle 102 comes close to the fuel truck for fueling, the system automatically collects the information from the vehicle 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the vehicle 102 until the vehicle 102 enters a covered location. The vehicle 102, itself, can then send the information to the main network.

It will also be noted that the elements of previous Figures, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
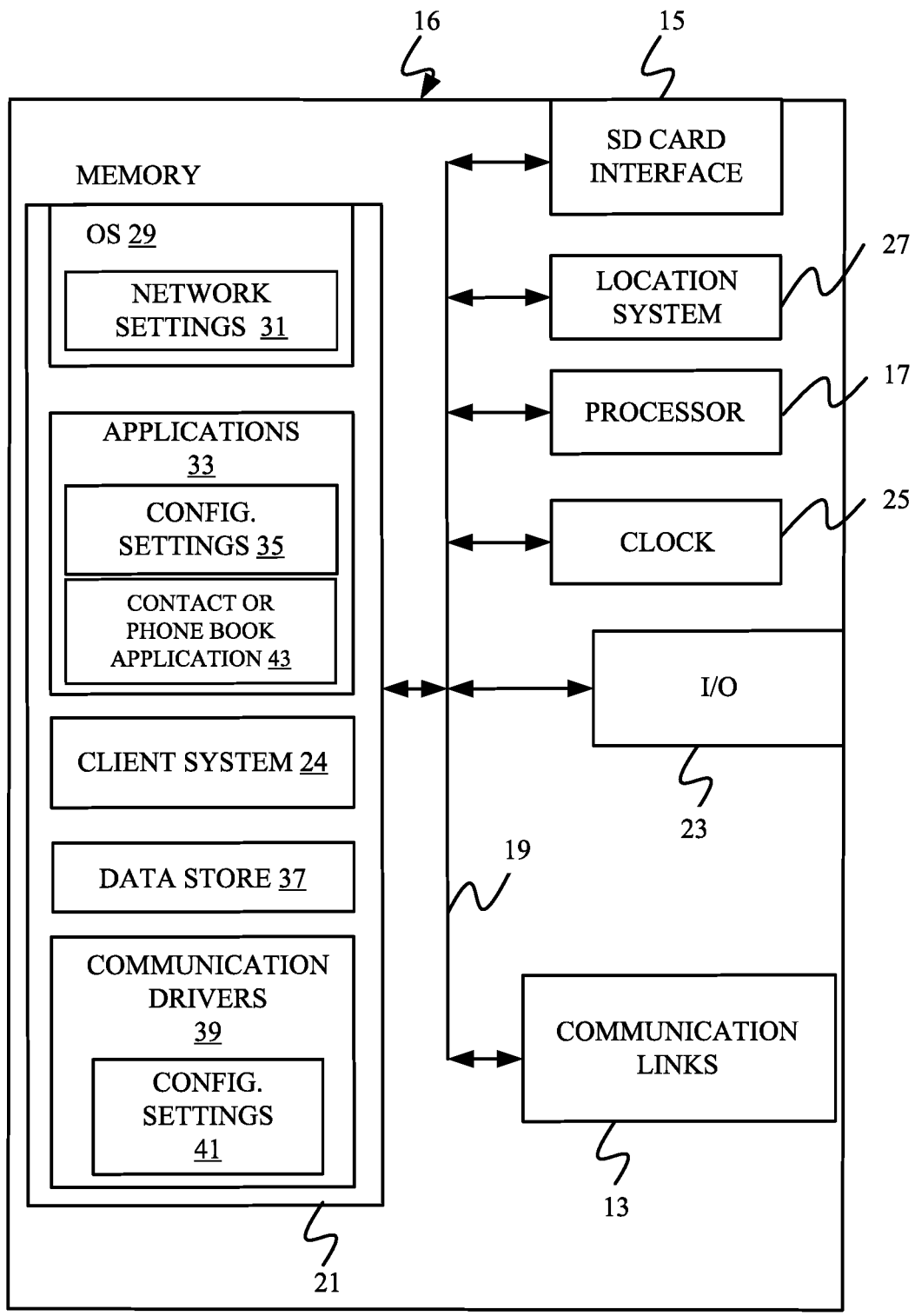
FIGS. 9-11 show examples of mobile devices that can be used in the architectures shown in the previous FIGS.
Figure 10:
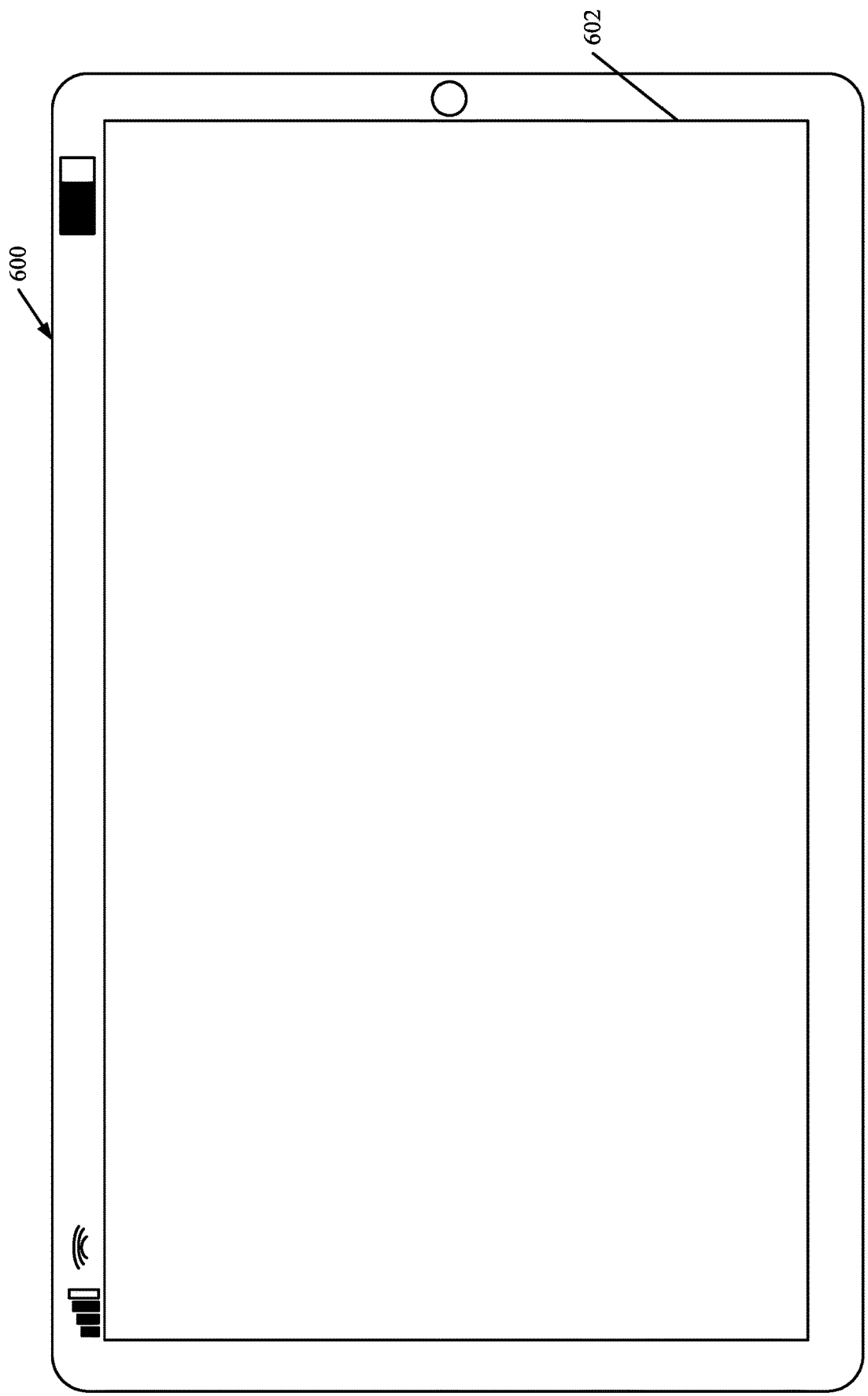
Figure 11:
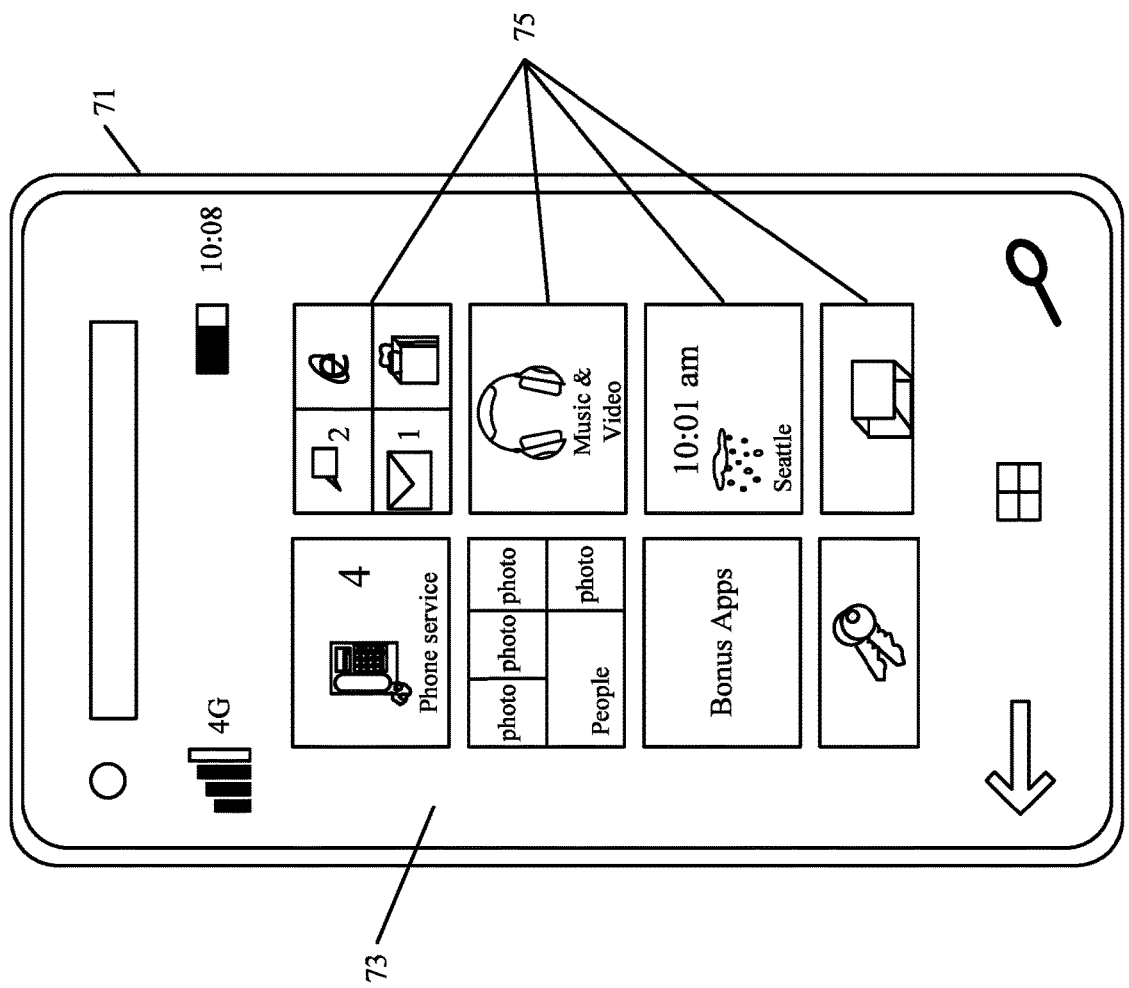

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of vehicle 102 for use in generating, processing, or displaying the fill level. FIGS. 10-11 are examples of handheld or mobile devices.

FIG. 9 provides a general block diagram of the components of a client device 16 that can run some components shown in previous Figures, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
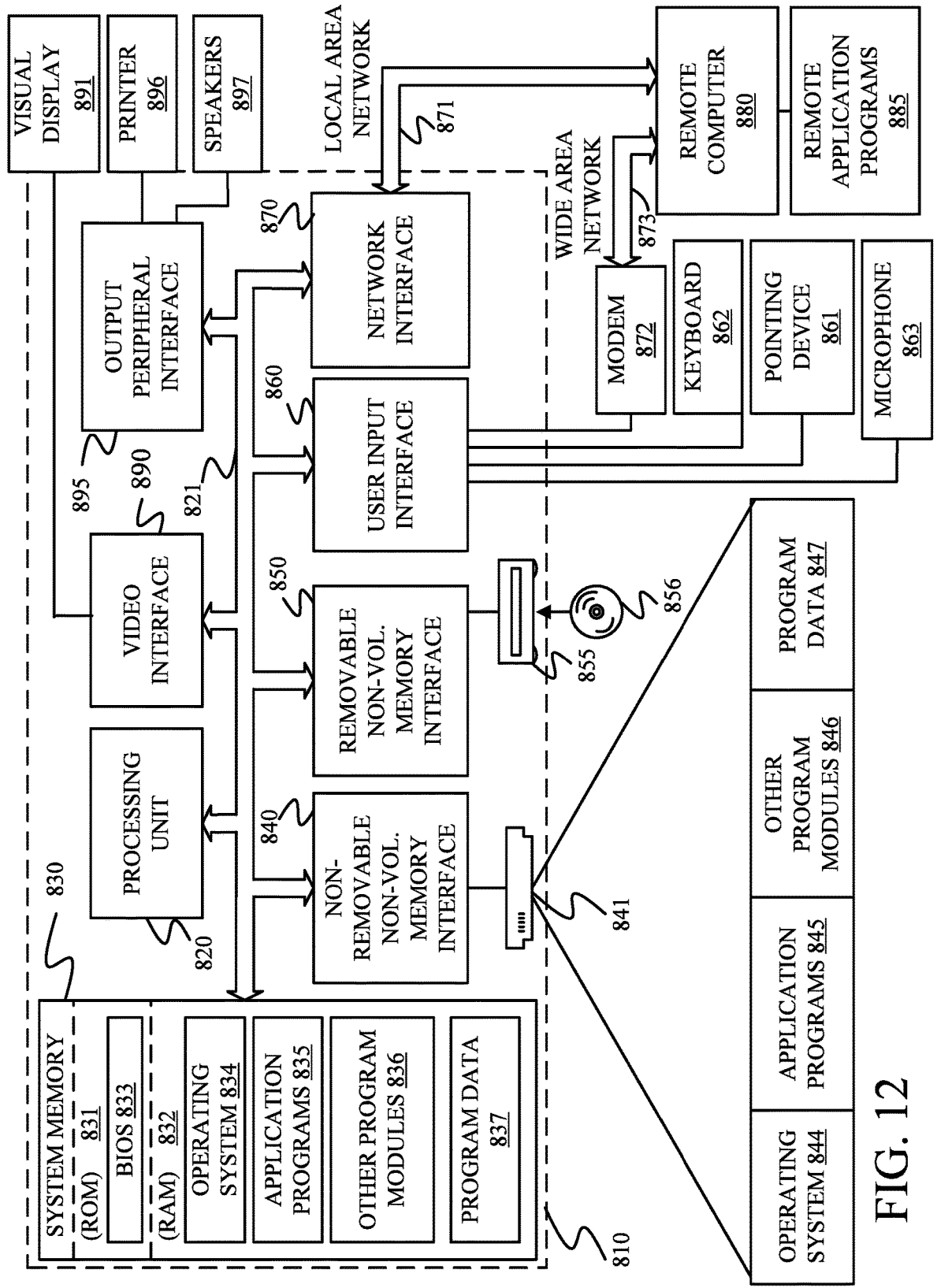
FIG. 12 shows a block diagram illustrating an example of a computing environment that can be used in the architectures shown in the previous FIGS.

FIG. 12 is one example of a computing environment in which elements of previous Figures, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous Figures can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network-LAN, controller area network-CAN or wide area network-WAN) to items on vehicle 102 or to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a vehicle transports a load receiving structure that receives material, the vehicle comprising:
 a propulsion system;
 an operator interface mechanism that receives operator inputs to control the propulsion system;
 a sensor that senses motion of the vehicle and generates a motion signal indicative of the sensed motion;
 sampling window identifier logic that identifies, as a sampling window, a time during which the motion signal indicates a high dynamic change in motion of the vehicle, the high dynamic change in motion being a change in which the vehicle exhibits a high change in acceleration relative to a low dynamic change in which the vehicle exhibits a lower change in acceleration;
 fill level classifier logic that receives sensor data, indicative of values of the sensor signal corresponding to the sampling window, and identifies a fill level of the load receiving structure corresponding to the sampling window, the fill level indicating how full the load receiving structure is of the material; and
 a control signal generator that generates an action signal based on the fill level.

Example 2 is the vehicle of any or all previous examples wherein the fill level classifier logic comprises:
 a plurality of fill level classifiers, each fill level classifier corresponding to a predetermined fill level and generating a fill level metric indicative of how well the sensor signal values correspond to expected sensor signal values for the predetermined fill level corresponding to the fill level classifier.

Example 3 is the vehicle of any or all previous examples wherein the fill level classifier logic comprises:
 a fill level identifier configured to identify the fill level of the load receiving structure based on the fill level metrics generated by the fill level classifiers.

Example 4 is the vehicle of any or all previous examples wherein the sampling window identifier logic comprises:
 an acceleration detector configured to detect an acceleration variable indicative of the acceleration of the vehicle; and
 a dynamic change identifier configured to detect the high dynamic change based, at least in part, on the detected acceleration variable.

Example 5 is the vehicle of any or all previous examples wherein the operator interface mechanism comprises an acceleration input mechanism configured to receive an operator actuation input to change the acceleration of the vehicle, and wherein the acceleration detector comprises:
 an operator interface mechanism detector configured to detect the operator actuation of the acceleration input mechanism and generate an actuation signal indicative of the detected operator actuation.

Example 6 is the vehicle of any or all previous examples wherein the acceleration input mechanism comprises:
 a throttle input mechanism; and
 a brake input mechanism.

Example 7 is the vehicle of any or all previous examples wherein the sample window identifier logic is configured to identify a plurality of successive sampling windows and wherein the fill level classifier logic is configured to identify a fill level corresponding to each of the plurality of successive sampling windows and further comprising:
 noise reduction logic configured to compare the fill levels identified for adjacent sampling windows, comprising a preceding sampling window and a following sampling window, and to identify the fill level corresponding to the following sampling window as being affected by noise if it is not at least as high as the fill level corresponding to the preceding sampling window.

Example 8 is the vehicle of any or all previous examples and further comprising:
 dump identifier logic configured to identify a dump operation during which the load receiving structure is emptied of the agricultural material, wherein the noise reduction logic is configured to identify the fill level corresponding to the following sampling window as being affected by noise if it is not less than the fill level corresponding to the preceding sampling window, if the dump identifier logic identified that a dump operation occurred between the preceding sampling window and the following sampling window.

Example 9 is the vehicle of any or all previous examples and further comprising:
 mass aggregator logic configured to receive a mass flow signal from a loading vehicle that loads the agricultural material being loaded into the load receiving structure, the mass flow signal being generated by a mass flow sensor on the loading vehicle and being indicative of a mass flow of the material through a portion of the loading vehicle, the mass aggregator logic being configured to identify an amount of the material unloaded from the loading vehicle based on the mass flow signal, wherein the noise reduction logic is configured to determine whether the fill level is affected by noise based on the amount of material identified by the mass aggregator.

Example 10 is the vehicle of any or all previous examples and further comprising:
 signal delay logic configured to generate a signal delay output indicative of a travel time from the mass flow sensor on the loading vehicle to an output end of the loading vehicle, the mass aggregator identifying the amount of material unloaded from the loading vehicle based on the signal delay output.

Example 11 is the vehicle of any or all previous examples and further comprising:
loss detection logic configured to generate a loss signal indicative of an amount of material unloaded from the loading vehicle that was not loaded into the load receiving structure, the noise reduction logic being configured to correct the amount of material identified by the mass aggregator based on the loss signal.

Example 12 is the vehicle of any or all previous examples wherein the loss detection logic is configured to receive the mass flow signal and detect when the output end of the loading vehicle is misaligned with the load receiving structure and to generate the loss signal based on the mass flow signal and a time during which the output end of the loading vehicle is misaligned with the load receiving structure.

Example 13 a computer implemented method of controlling a vehicle that transports a load receiving structure that receives material, the method comprising:
sensing motion of the vehicle;
generating a motion signal indicative of the sensed motion;
identifying, as a sampling window, a time during which the motion signal indicates a high dynamic change in motion of the vehicle, the high dynamic change in motion being a change in which the vehicle exhibits a high change in acceleration relative to a low dynamic change in which the vehicle exhibits a lower change in acceleration;
receiving sensor data, indicative of values of the sensor signal corresponding to the sampling window;
identifying a fill level of the load receiving structure corresponding to the sampling window, based on the received sensor data, the fill level indicating how full the load receiving structure is of the material; and
generating an action signal based on the fill level.

Example 14 is the computer implemented method of any or all previous examples wherein identifying a fill level comprises:
applying the sensor data corresponding to the sampling window to a plurality of fill level classifiers, each fill level classifier corresponding to a predetermined fill level and generating a fill level metric indicative of how well the sensor data corresponds to expected sensor data for the predetermined fill level corresponding to the fill level classifier; and
identifying the fill level of the load receiving structure based on the fill level metrics generated by the plurality of fill level classifiers.

Example 15 is the computer implemented method of any or all previous examples wherein identifying the sampling window comprises identifying a plurality of successive sampling windows and wherein identifying the fill level comprises identifying a fill level corresponding to each of the plurality of successive sampling windows and further comprising:
comparing the fill levels identified for adjacent sampling windows, comprising a preceding sampling window and a following sampling window; and
identifying the fill level corresponding to the following sampling window as being affected by noise if it is not at least as high as the fill level corresponding to the preceding sampling window.

Example 16 is the computer implemented method of any or all previous examples and further comprising:
identifying a dump operation during which the load receiving structure is emptied of the material; and
identifying the fill level corresponding to the following sampling window as being affected by noise if it is not less than the fill level corresponding to the preceding sampling window, if a dump operation occurred between the preceding sampling window and the following sampling window.

Example 17 is the computer implemented method of any or all previous examples and further comprising:
receiving a mass flow signal from a loading vehicle that loads the material into the load receiving structure, the mass flow signal being generated by a mass flow sensor on the loading vehicle and being indicative of a mass flow of the material through a portion of the loading vehicle;
identifying an amount of the material unloaded from the loading vehicle based on the mass flow signal; and
determining whether the fill level is affected by noise based on the amount of material identified based on the mass flow signal.

Example 18 is the computer implemented method of any or all previous examples and further comprising:
detecting lost material indicative of an amount of material unloaded from the loading vehicle that was not loaded into the load receiving structure;
generating a loss signal indicative of the lost material; and
correcting, based on the loss signal, the amount of material identified based on the mass flow signal.

Example 19 a control system for controlling a vehicle that transports a load receiving structure that carries material, the control system comprising:
a sensor that senses motion of the vehicle and generates a motion signal indicative of the sensed motion;
sampling window identifier logic that identifies, as a sampling window, a time during which the motion signal indicates a high change in acceleration relative to a lower change in acceleration;
fill level classifier logic that receives sensor data, indicative of values of the sensor signal corresponding to the sampling window, and identifies a fill level of the load receiving structure corresponding to the sampling window, the fill level indicating how full the load receiving structure is of the material; and
a control signal generator that generates an action signal based on the fill level.

Example 20 is the control system of any or all previous examples wherein the fill level classifier logic comprises:
a plurality of fill level classifiers, each fill level classifier corresponding to a predetermined fill level and generating a fill level metric indicative of how well the sensor data corresponds to expected sensor data for the predetermined fill level corresponding to the fill level classifier; and
a fill level identifier configured to identify the fill level of the load receiving structure based on the fill level metrics generated by the fill level classifiers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A vehicle transports a load receiving structure that receives material, the vehicle comprising:
a propulsion system;

an operator interface mechanism that receives operator inputs to control the propulsion system;
a sensor that senses motion of the vehicle and generates a motion signal indicative of the sensed motion;
sampling window identifier logic that identifies, as a sampling window, a time during which the motion signal indicates a high dynamic change in motion of the vehicle, the high dynamic change in motion being a change in which the vehicle exhibits a high change in acceleration relative to a low dynamic change in which the vehicle exhibits a lower change in acceleration;
fill level classifier logic that receives sensor data, indicative of values of the sensor signal corresponding to the sampling window, and identifies a fill level of the load receiving structure corresponding to the sampling window, the fill level indicating how full the load receiving structure is of the material; and
a control signal generator that generates an action signal based on the fill level.

2. The vehicle of claim 1 wherein the fill level classifier logic comprises:
a plurality of fill level classifiers, each fill level classifier corresponding to a predetermined fill level and generating a fill level metric indicative of how well the sensor signal values correspond to expected sensor signal values for the predetermined fill level corresponding to the fill level classifier.

3. The vehicle of claim 2 wherein the fill level classifier logic comprises:
a fill level identifier configured to identify the fill level of the load receiving structure based on the fill level metrics generated by the fill level classifiers.

4. The vehicle of claim 1 wherein the sampling window identifier logic comprises:
an acceleration detector configured to detect an acceleration variable indicative of the acceleration of the vehicle; and
a dynamic change identifier configured to detect the high dynamic change based, at least in part, on the detected acceleration variable.

5. The vehicle of claim 4 wherein the operator interface mechanism comprises an acceleration input mechanism configured to receive an operator actuation input to change the acceleration of the vehicle, and wherein the acceleration detector comprises:
an operator interface mechanism detector configured to detect the operator actuation of the acceleration input mechanism and generate an actuation signal indicative of the detected operator actuation.

6. The vehicle of claim 5 wherein the acceleration input mechanism comprises:
a throttle input mechanism; and
a brake input mechanism.

7. The vehicle of claim 1 wherein the sample window identifier logic is configured to identify a plurality of successive sampling windows and wherein the fill level classifier logic is configured to identify a fill level corresponding to each of the plurality of successive sampling windows and further comprising:
noise reduction logic configured to compare the fill levels identified for adjacent sampling windows, comprising a preceding sampling window and a following sampling window, and to identify the fill level corresponding to the following sampling window as being affected by noise if it is not at least as high as the fill level corresponding to the preceding sampling window.

8. The vehicle of claim 7 and further comprising:

dump identifier logic configured to identify a dump operation during which the load receiving structure is emptied of the agricultural material, wherein the noise reduction logic is configured to identify the fill level corresponding to the following sampling window as being affected by noise if it is not less than the fill level corresponding to the preceding sampling window, if the dump identifier logic identified that a dump operation occurred between the preceding sampling window and the following sampling window.

9. The vehicle of claim 7 and further comprising:
mass aggregator logic configured to receive a mass flow signal from a loading vehicle that loads the agricultural material being loaded into the load receiving structure, the mass flow signal being generated by a mass flow sensor on the loading vehicle and being indicative of a mass flow of the material through a portion of the loading vehicle, the mass aggregator logic being configured to identify an amount of the material unloaded from the loading vehicle based on the mass flow signal, wherein the noise reduction logic is configured to determine whether the fill level is affected by noise based on the amount of material identified by the mass aggregator.

10. The vehicle of claim 9 and further comprising:
signal delay logic configured to generate a signal delay output indicative of a travel time from the mass flow sensor on the loading vehicle to an output end of the loading vehicle, the mass aggregator identifying the amount of material unloaded from the loading vehicle based on the signal delay output.

11. The vehicle of claim 9 and further comprising:
loss detection logic configured to generate a loss signal indicative of an amount of material unloaded from the loading vehicle that was not loaded into the load receiving structure, the noise reduction logic being configured to correct the amount of material identified by the mass aggregator based on the loss signal.

12. The vehicle of claim 11 wherein the loss detection logic is configured to receive the mass flow signal and detect when the output end of the loading vehicle is misaligned with the load receiving structure and to generate the loss signal based on the mass flow signal and a time during which the output end of the loading vehicle is misaligned with the load receiving structure.

13. A computer implemented method of controlling a vehicle that transports a load receiving structure that receives material, the method comprising:
sensing motion of the vehicle;
generating a motion signal indicative of the sensed motion;
identifying, as a sampling window, a time during which the motion signal indicates a high dynamic change in motion of the vehicle, the high dynamic change in motion being a change in which the vehicle exhibits a high change in acceleration relative to a low dynamic change in which the vehicle exhibits a lower change in acceleration;
receiving sensor data, indicative of values of the sensor signal corresponding to the sampling window;
identifying a fill level of the load receiving structure corresponding to the sampling window, based on the received sensor data, the fill level indicating how full the load receiving structure is of the material; and
generating an action signal based on the fill level.

14. The computer implemented method of claim 13 wherein identifying a fill level comprises:

applying the sensor data corresponding to the sampling window to a plurality of fill level classifiers, each fill level classifier corresponding to a predetermined fill level and generating a fill level metric indicative of how well the sensor data corresponds to expected sensor data for the predetermined fill level corresponding to the fill level classifier; and identifying the fill level of the load receiving structure based on the fill level metrics generated by the plurality of fill level classifiers.

15. The computer implemented method of claim 13 wherein identifying the sampling window comprises identifying a plurality of successive sampling windows and wherein identifying the fill level comprises identifying a fill level corresponding to each of the plurality of successive sampling windows and further comprising:

comparing the fill levels identified for adjacent sampling windows, comprising a preceding sampling window and a following sampling window; and identifying the fill level corresponding to the following sampling window as being affected by noise if it is not at least as high as the fill level corresponding to the preceding sampling window.

16. The computer implemented method of claim 15 and further comprising:

identifying a dump operation during which the load receiving structure is emptied of the material; and identifying the fill level corresponding to the following sampling window as being affected by noise if it is not less than the fill level corresponding to the preceding sampling window, if a dump operation occurred between the preceding sampling window and the following sampling window.

17. The computer implemented method of claim 15 and further comprising:

receiving a mass flow signal from a loading vehicle that loads the material into the load receiving structure, the mass flow signal being generated by a mass flow sensor on the loading vehicle and being indicative of a mass flow of the material through a portion of the loading vehicle;

identifying an amount of the material unloaded from the loading vehicle based on the mass flow signal; and determining whether the fill level is affected by noise based on the amount of material identified based on the mass flow signal.

18. The computer implemented method of claim 17 and further comprising:

detecting lost material indicative of an amount of material unloaded from the loading vehicle that was not loaded into the load receiving structure;

generating a loss signal indicative of the lost material; and correcting, based on the loss signal, the amount of material identified based on the mass flow signal.

19. A control system for controlling a vehicle that transports a load receiving structure that carries material, the control system comprising:

a sensor that senses motion of the vehicle and generates a motion signal indicative of the sensed motion;

sampling window identifier logic that identifies, as a sampling window, a time during which the motion signal indicates a high change in acceleration relative to a lower change in acceleration;

fill level classifier logic that receives sensor data, indicative of values of the sensor signal corresponding to the sampling window, and identifies a fill level of the load receiving structure corresponding to the sampling window, the fill level indicating how full the load receiving structure is of the material; and a control signal generator that generates an action signal based on the fill level.

20. The control system of claim 19 wherein the fill level classifier logic comprises:

a plurality of fill level classifiers, each fill level classifier corresponding to a predetermined fill level and generating a fill level metric indicative of how well the sensor data corresponds to expected sensor data for the predetermined fill level corresponding to the fill level classifier; and a fill level identifier configured to identify the fill level of the load receiving structure based on the fill level metrics generated by the fill level classifiers.

* * * * *